United States Patent
Shiota et al.

(10) Patent No.: US 11,504,740 B2
(45) Date of Patent: Nov. 22, 2022

(54) WATER/OIL REPELLENT ARTICLE, METHOD FOR ITS PRODUCTION AND WATER/OIL REPELLENT COMPOSITION

(71) Applicant: AGC Inc., Chiyoda-ku (JP)

(72) Inventors: Yukiko Shiota, Chiyoda-ku (JP); Hiroyuki Hara, Chiyoda-ku (JP); Akira Isobe, Chiyoda-ku (JP); Reika Fukuda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 699 days.

(21) Appl. No.: 16/431,202

(22) Filed: Jun. 4, 2019

(65) Prior Publication Data

US 2019/0283080 A1 Sep. 19, 2019

Related U.S. Application Data

(63) Continuation of application No. PCT/JP2018/008628, filed on Mar. 6, 2018.

(30) Foreign Application Priority Data

Mar. 7, 2017 (JP) ............................. JP2017-042648
Nov. 15, 2017 (JP) ............................. JP2017-220494

(51) Int. Cl.
| | |
|---|---|
| B05D 5/08 | (2006.01) |
| C09D 127/14 | (2006.01) |
| C09D 133/10 | (2006.01) |
| C08L 27/12 | (2006.01) |
| C09D 201/04 | (2006.01) |
| C09D 133/04 | (2006.01) |
| C09D 5/00 | (2006.01) |
| C08L 71/00 | (2006.01) |
| C09K 3/18 | (2006.01) |
| D06M 15/256 | (2006.01) |
| C09D 123/28 | (2006.01) |
| C09D 171/00 | (2006.01) |
| D06M 15/277 | (2006.01) |
| D06M 15/53 | (2006.01) |

(52) U.S. Cl.
CPC .............. *B05D 5/083* (2013.01); *C08L 27/12* (2013.01); *C08L 71/00* (2013.01); *C09D 5/00* (2013.01); *C09D 123/28* (2013.01); *C09D 127/14* (2013.01); *C09D 133/04* (2013.01); *C09D 133/10* (2013.01); *C09D 171/00* (2013.01); *C09D 201/04* (2013.01); *C09K 3/18* (2013.01); *D06M 15/256* (2013.01); *D06M 15/277* (2013.01); *D06M 15/53* (2013.01); *B05D 2401/21* (2013.01); *B05D 2506/10* (2013.01)

(58) Field of Classification Search
CPC ....................................................... B05D 5/083
See application file for complete search history.

(56) References Cited

U.S. PATENT DOCUMENTS

| | | | |
|---|---|---|---|
| 2012/0296029 A1* | 11/2012 | Liu | ........................ C08F 297/02 977/773 |
| 2013/0302598 A1 | 11/2013 | Haraguchi et al. | |
| 2016/0098823 A1* | 4/2016 | Lin | .......................... G06T 5/003 345/620 |
| 2017/0275813 A1* | 9/2017 | Isobe | ................ C08F 220/1818 |

FOREIGN PATENT DOCUMENTS

| | | |
|---|---|---|
| JP | 2004-75736 | 3/2004 |
| JP | 2013-231168 A | 11/2013 |
| JP | 2014-37511 A | 2/2014 |
| JP | 2014-513174 A | 5/2014 |
| JP | 2018-31000 | 3/2018 |
| JP | 2018-63302 | 4/2018 |
| WO | WO 2008/136435 A1 | 11/2008 |
| WO | WO 2012/020806 A1 | 2/2012 |
| WO | WO 2012/074071 A1 | 6/2012 |
| WO | 2013-534574 | 9/2013 |
| WO | WO 2016/098823 A1 | 6/2016 |

OTHER PUBLICATIONS

International Search Report dated May 22, 2018 in PCT/JP2018/008628 filed Mar. 6, 2018 (with English Translation).

* cited by examiner

*Primary Examiner* — Dah-Wei D. Yuan
*Assistant Examiner* — Kristen A Dagenais-Englehart
(74) *Attorney, Agent, or Firm* — Oblon, McClelland, Maier & Neustadt, L.L.P.

(57) ABSTRACT

To provide a water/oil repellent article which presents little burden on the environment, while being excellent in water/oil repellency, washing durability of the water repellency and friction durability of the water repellency; a method for producing such a water/oil repellent article; and a water/oil repellent composition and a water/oil repellent kit to be used for producing such a water/oil repellent article. A water/oil repellent article that comprises a substrate and, as adhered to the surface of the substrate, a fluorinated polymer having structural units based on monomer (a) having a $C_{1-6}$ perfluoroalkyl group, and a specific fluorinated ether compound; a method for producing the water/oil repellent article, which comprises letting the fluorinated polymer and fluorinated ether compound be adhered to the substrate; a water/oil repellent composition which comprises the fluorinated polymer and fluorinated ether compound; and a water/oil repellent kit which comprises a first container accommodating a first liquid containing the fluorinated polymer and a second container accommodating a second liquid containing the fluorinated ether compound.

10 Claims, No Drawings

WATER/OIL REPELLENT ARTICLE, METHOD FOR ITS PRODUCTION AND WATER/OIL REPELLENT COMPOSITION

TECHNICAL FIELD

The present invention relates to a water/oil repellent article, a method for its production, a water/oil repellent composition to be used in the production of the water/oil repellent article, and a water/oil repellent kit.

BACKGROUND ART

As a method for imparting water and oil repellency to the surface of an article (such as a fiber substrate), a method is known wherein the article is treated by using a water/oil repellent composition composed of an emulsion prepared by dispersing, in a medium, a copolymer having structural units based on a monomer having a polyfluoroalkyl group with 8 or more carbon atoms (hereinafter, a polyfluoroalkyl group will be referred to as a $R^f$ group).

However, recently, it has been pointed out by EPA (US Environmental Protection Agency) that a compound having a perfluoroalkyl group with 8 or more carbon atoms (hereinafter, a perfluoroalkyl group will be referred to as a $R^F$ group) is likely to be decomposed in the environment or in vivo so that the decomposition product is likely to be accumulated, i.e. its environmental load is large. Therefore, a copolymer for a water/oil repellent composition is demanded which has structural units based on a monomer having a $R^F$ group with at most 6 carbon atoms and in which structural units based on a monomer having a $R^F$ group with 8 or more carbon atoms are reduced as far as possible.

As an article (hereinafter referred to also as a water/oil repellent article) treated with a water/oil repellent composition containing such a copolymer, for example, the following one has been proposed.

An article treated by using a water/oil repellent composition containing a copolymer having structural units based on the following monomer (a), structural units based on the following monomer (b) and structural units based on the following monomer (c) (Patent Document 1).

Monomer (a): a monomer having a $R^F$ group with at most 6 carbon atoms

Monomer (b): a (meth)acrylate having a $C_{20-30}$ alkyl group

Monomer (c): vinylidene chloride

The water/oil repellent article is required to be such that the water repellency will not be reduced even if friction between such articles each other or friction of the water/oil repellent article with another article is continued (friction durability), and the water repellency will not be reduced even if washing is repeated (washing durability). However, the water/oil repellent article disclosed in Patent Document 1 was not sufficient in the friction durability and washing durability.

As a method for imparting durability to a water/oil repellent article, a method of adding an aqueous dispersion of polytetrafluoroethylene to the water/oil repellent composition has been proposed (Patent Document 2). However, even by this method, it is not possible to provide sufficient friction durability to the water/oil repellent article.

As a coated substrate having the friction resistance improved, a coated substrate has been proposed wherein a polyester type fiber substrate is coated with a coating composition containing a perfluoropolyether having a specific structure (Patent Document 3). However, this coated substrate is not sufficient in the water and oil repellency.

PRIOR ART DOCUMENTS

Patent Documents

Patent Document 1: WO2008/136435
Patent Document 2: WO2012/020806
Patent Document 3: JP-A-2013-534574

DISCLOSURE OF INVENTION

Technical Problem

The present invention is to provide a water/oil repellent article which presents less environmental load and which is excellent in water and oil repellency, washing durability of the water repellency and friction durability of the water repellency, and a method for its production, as well as a water/oil repellent composition and water/oil repellent kit to be used for the production of the water/oil repellent article.

Solution to Problem

The present invention has the following embodiments.
<1> A water/oil repellent article comprising a substrate and, as adhered to the surface of the substrate, the following fluorinated polymer and fluorinated ether compound:

Fluorinated polymer: a polymer having structural units based on monomer (a) having a $C_{1-6}$ perfluoroalkyl group, Fluorinated ether compound: a compound represented by the following formula (5):

$$A-U-W-V-B \quad (5)$$

where A and B are each independently —$CF_3$, —OH, —C(O)$OCH_3$, —C(O)OH or a hydrolyzable silyl group (but excluding a case where both A and B are —C(O)OH), U is a divalent organic group which may have fluorine atom(s), an oxygen atom (provided only when A is $CF_3$—) or a single bond, V is a divalent organic group which may have fluorine atom(s), or a single bond (provided only when B is —$CF_3$), and W is a group represented by the following formula (6):

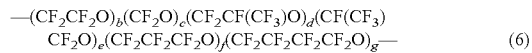
$$—(CF_2CF_2O)_b(CF_2O)_c(CF_2CF(CF_3)O)_d(CF(CF_3)CF_2O)_e(CF_2CF_2CF_2O)_f(CF_2CF_2CF_2CF_2O)_g— \quad (6)$$

where b, c, d, e, f and g are each independently an integer of from 0 to 180, provided that b+c+d+e+f+g is an integer of from 5 to 400, and the order of binding of the respective oxyperfluoroalkylene units is not limited.

<2> The water/oil repellent article according to <1>, wherein the monomer (a) is a compound represented by the following formula (1):

$$(Z—Y)_nX \quad (1)$$

where Z is a $C_{1-6}$ perfluoroalkyl group or a group represented by the following formula (2), Y is a divalent organic group having no fluorine atom, or a single bond, n is 1 or 2, and X is, when n is 1, any one of groups represented by the following formulae (3-1) to (3-5), and when n is 2, any one of groups represented by the following formulae (4-1) to (4-4):

$$C_iF_{2i+1}(CH_2CF_2)_p(CF_2CF_2)_q— \quad (2)$$

where i is an integer of from 1 to 6, p is an integer of from 1 to 4, and q is an integer of from 1 to 3, $$—CR=CH_2 \tag{3-1}$$

$$—C(O)OCR=CH_2 \tag{3-2}$$

$$—OC(O)CR=CH_2 \tag{3-3}$$

$$—OCH_2\text{-}\varphi\text{—}CR=CH_2 \tag{3-4}$$

$$—OCH=CH_2 \tag{3-5}$$

where R is a hydrogen atom, a methyl group or a halogen atom, and $\varphi$ is a phenylene group, $$—CH[—(CH_2)_mCR=CH_2]— \tag{4-1}$$

$$—CH[—(CH_2)_mC(O)OCR=CH_2]— \tag{4-2}$$

$$—CH[—(CH_2)_mOC(O)CR=CH_2]— \tag{4-3}$$

$$—OC(O)CH=CHC(O)O— \tag{4-4}$$

where R is a hydrogen atom, a methyl group or a halogen atom, and m is an integer of from 0 to 4.

<3> The water/oil repellent article according to <1> or <2>, wherein the fluorinated polymer further has one or both of structural units based on the following monomer (b1) and structural units based on the following monomer (b2):

Monomer (b1): a (meth)acrylate having no polyfluoroalkyl group and having a $C_{12\text{-}30}$ alkyl group, Monomer (b2): a halogenated olefin.

<4> The water/oil repellent article according to <3>, wherein the fluorinated polymer further has one or both of structural units based on a monomer (c) having a cross-linkable functional group and structural units based on other monomer (d) (but excluding monomers (a), (b1) and (b2)).

<5> A method for producing a water/oil repellent article as defined in any one of <1> to <4>, which comprises letting the fluorinated polymer and fluorinated ether compound be adhered to the substrate.

<6> The method for producing a water/oil repellent article according to <5>, wherein the substrate is treated with a water/oil repellent composition containing the fluorinated polymer and fluorinated ether compound.

<7> The method for producing a water/oil repellent article according to <5>, wherein the substrate is treated with a first liquid containing the fluorinated polymer, and the substrate treated with the first liquid is treated with a second liquid containing the fluorinated ether compound.

<8> The method for producing a water/oil repellent article according to <7>, wherein the second liquid contains a fluorinated solvent, of which the boiling point at atmospheric pressure (normal boiling point) is at least 50° C.

<9> The method for producing a water/oil repellent article according to <8>, wherein the fluorinated solvent is at least one member selected from the group consisting of 1,1,1,2,2,3,3,4,4,5,5,6,6-tridecafluoro-octane, 1,1,2,2-tetrafluoroethyl-2,2,2-trifluoroethyl ether, 1-methoxy-1,1,2,2,3,3,3-heptafluoropropane, 1-methoxy-1,1,2,2,3,3,4,4,4-nonafluorobutane, 1-ethoxy-1,1,2,2,3,3,4,4,4-nonafluorobutane, 1,1,1,2,2,3,4,5,5,5-decafluoro-3-methoxy-4-trifluoromethyl-pentane, 1,1,1,2,2,3,4,5,5,5-decafluoropentane, poly(1,1,2,3,3,3-hexafluoropropene oxide), 1,3-bistrifluoromethylbenzene, 1,4-trifluoromethyl-benzene, trifluorotoluene, perfluorobenzene and perfluorobutylamine.

<10> The method for producing a water/oil repellent article according to any one of <5> to <9>, wherein the amount of the fluorinated ether compound to 100 parts by mass of the fluorinated polymer, is from 0.1 to 100 parts by mass.

<11> The method for producing a water/oil repellent article according to any one of <5> to <10>, wherein the amount of the fluorinated ether compound to 100 parts by mass of the fluorinated polymer, is from 30 to 100 parts by mass.

<12> A water/oil repellent composition comprising the following fluorinated polymer and the following fluorinated ether compound:

Fluorinated polymer: a polymer having structural units based on monomer (a) having a $C_{1\text{-}6}$ perfluoroalkyl group, Fluorinated ether compound: a compound represented by the following formula (5):

$$A\text{-}U\text{—}W\text{—}V\text{—}B \tag{5}$$

where A and B are each independently —$CF_3$, —OH, —$C(O)OCH_3$, —$C(O)OH$ or a hydrolyzable silyl group (but excluding a case where both A and B are —$C(O)OH$), U is a divalent organic group which may have fluorine atom(s), an oxygen atom (provided only when A is $CF_3$—) or a single bond, V is a divalent organic group which may have fluorine atom(s), or a single bond (provided only when B is —$CF_3$), and W is a group represented by the following formula (6).

$$—(CF_2CF_2O)_b(CF_2O)_c(CF_2CF(CF_3)O)_d(CF(CF_3)CF_2O)_e(CF_2CF_2CF_2O)_f(CF_2CF_2CF_2CF_2O)_g— \tag{6}$$

where b, c, d, e, f and g are each independently an integer of from 0 to 180, provided that b+c+d+e+f+g is an integer of from 5 to 400, and the order of binding of the respective oxyperfluoroalkylene units is not limited.

<13> A water/oil repellent kit comprising a first container accommodating a first liquid containing the following fluorinated polymer, and a second container accommodating a second liquid containing the following fluorinated ether compound:

Fluorinated polymer: a polymer having structural units based on monomer (a) having a $C_{1\text{-}6}$ perfluoroalkyl group, Fluorinated ether compound: a compound represented by the following formula (5):

$$A\text{-}U\text{—}W\text{—}V\text{—}B \tag{5}$$

where A and B are each independently —$CF_3$, —OH, —$C(O)OCH_3$, —$C(O)OH$ or a hydrolyzable silyl group (but excluding a case where both A and B are —$C(O)OH$), U is a divalent organic group which may have fluorine atom(s), an oxygen atom (provided only when A is $CF_3$—) or a single bond, V is a divalent organic group which may have fluorine atom(s), or a single bond (provided only when B is —$CF_3$), and W is a group represented by the following formula (6).

$$—(CF_2CF_2O)_b(CF_2O)_c(CF_2CF(CF_3)O)_d(CF(CF_3)CF_2O)_e(CF_2CF_2CF_2O)_f(CF_2CF_2CF_2CF_2O)_g— \tag{6}$$

where b, c, d, e, f and g are each independently an integer of from 0 to 180, provided that b+c+d+e+f+g is an integer of from 5 to 400, and the order of binding of the respective oxyperfluoroalkylene units is not limited.

Advantageous Effects of Invention

According to the present invention, it is possible to provide a water/oil repellent article which presents less environmental load and which is excellent in water and oil repellency, washing durability of the water repellency and friction durability of the water repellency, and a method for its production, as well as a water/oil repellent composition and a water/oil repellent kit.

DESCRIPTION OF EMBODIMENTS

In this specification, meanings of terms and the manner of description are as follows.

A "compound represented by formula (1)" will be referred to as "compound (1)". Compounds represented by other formulae will be referred to accordingly. Further, a "group represented by the formula (2)" will be referred to as "group (2)". Groups represented by other formulae will be referred to accordingly.

A "(meth)acrylate" is a general term for an acrylate and a methacrylate.

A "$R^f$ group" means a group in which some or all of hydrogen atoms in an alkyl group are substituted by fluorine atoms, and a "$R^F$ group" means a group in which all of hydrogen atoms in an alkyl group are substituted by fluorine atoms.

The "number average molecular weight (Mn)" and the "mass average molecular weight (Mw)" of a fluorinated polymer are values obtained as calculated as polystyrene by a gel permeation chromatography (GPC) method.

The "solid content concentration" is calculated by solid content concentration=(mass of solid content/mass of sample)×100, where mass of sample is the mass of the sample before heating, and mass of solid content is the mass after drying the sample by a convection dryer at 120° C. for four hours.

<Water/Oil Repellent Article>

The water/oil repellent article of the present invention comprises a substrate and a specific fluorinated polymer and specific fluorinated ether compound. The specific fluorinated polymer and specific fluorinated ether compound are usually present in such a state as adhered to the substrate.

Here, the substrate means a structural member of the article itself in the water/oil repellent article. As the substrate, fibers (natural fibers, synthetic fibers, blended fibers, etc.), various fiber products, nonwoven fabrics, resins, paper, leather, wood, metal, stone, concrete, plaster, glass, etc. may be mentioned.

(Fluorinated Polymer)

The fluorinated polymer has structural units based on monomer (a). The fluorinated polymer preferably further contains either one or both of structural units based on monomer (b1) and structural units based on monomer (b2).

As the case requires, the fluorinated polymer may further have either one or both of structural units based on monomer (c) and structural units based on monomer (d).

Monomer (a):

The monomer (a) is a monomer having a $C_{1-6}$ perfluoroalkyl group.

As the fluorinated polymer has structural units based on the monomer (a), it is possible to obtain a water/oil repellent article which presents less environmental load and which is excellent in water and oil repellency.

As the monomer (a), a compound (1) is preferred from such a viewpoint that the water and oil repellency of the water/oil repellent article will be further excellent.

(1)

Z is a $C_{1-6}$ $R^F$ group, or group (2).

(2)

where i is an integer of from 1 to 6, p is an integer of from 1 to 4, and q is an integer of from 1 to 3.

The number of carbon atoms in the $R^F$ group is preferably from 4 to 6. The $R^F$ group may be linear or branched and is preferably linear.

Z may, for example, be $F(CF_2)_4—$, $F(CF_2)_5—$, $F(CF_2)_6—$, $(CF_3)_2CF(CF_2)_2—$, etc.

Y is a divalent organic group having no fluorine atom, or a single bond.

As the divalent organic group, a linear or branched alkylene group is preferred. The alkylene group may have, between carbon atoms, —O—, —NH—, —CO—, —SO_2—, —S—, —CD^1=CD^2- (where $D^1$ and $D^2$ are each independently a hydrogen atom or a methyl group), -φ—C(O)O— (where (φ is a phenylene group), etc.

Y may be —CH_2—, —CH_2CH_2—, —(CH_2)_3—, —CH_2CH_2CH(CH_3)—, —CH=CH—CH_2—, —S—CH_2CH_2—, —SO_2—CH_2CH_2—, —CH_2CH_2CH_2—S—CH_2CH_2—, —CH_2CH_2CH_2—SO_2—CH_2CH_2—, —CH_2CH_2—OC(O)-φ-, etc.

n is 1 or 2.

X is, when n is 1, any one of group (3-1) to group (3-5), and, when n is 2, any one of group (4-1) to group (4-4).

(3-1)

(3-2)

(3-3)

(3-4)

(3-5)

where R is a hydrogen atom, a methyl group or a halogen atom, and φ is a phenylene group.

(4-1)

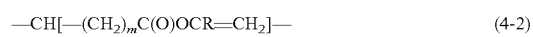(4-2)

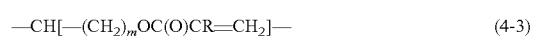(4-3)

(4-4)

where R is a hydrogen atom, a methyl group or a halogen atom, and m is an integer of from 0 to 4. R is preferably a hydrogen atom, a methyl group or a chlorine atom.

As the compound (1), preferred is an acrylate, methacrylate or α-position halogenated acrylate, having a preferably $C_{1-6}$, more preferably $C_{4-6}$, $R^F$ group, from the viewpoint of the polymerizability with other monomers, flexibility of a film of the fluorinated polymer, adhesion of the fluorinated polymer to the substrate, dispersibility or solubility in media, efficiency for emulsion polymerization, etc.

As the compound (1), particularly preferred is a compound wherein Z is a $C_{4-6}$ $R^F$ group, Y is a $C_{1-4}$ alkylene group or $CH_2CH_2OC(O)$-φ-, n is 1, X is group (3-3), and R is a hydrogen atom, a methyl group or a chlorine atom.

Preferred specific examples of the compound (1) may be $C_6F_{13}C_2H_4OC(O)C(CH_3)=CH_2$, $C_6F_{13}C_2H_4OC(O)CH=CH_2$, $C_6F_{13}C_2H_4OC(O)CCl=CH_2$, $C_4F_9C_2H_4OC(O)C(CH_3)=CH_2$, $C_4F_9C_2H_4OC(O)CH=CH_2$, $C_4F_9O_2H_4OC(O)CCl=CH_2$, $F(CF_2)_6CH_2CH_2OC(O)$-φ-$OC(O)CH=CH_2$, $F(CF_2)_6CH_2CH_2OC(O)$-φ-$OC(O)C(CH_3)=CH_2$, $F(CF_2)_4CH_2CH_2OC(O)$-φ-$OC(O)CH=CH_2$, $F(CF_2)_4CH_2CH_2OC(O)$-φ-$OC(O)C(CH_3)=CH_2$, etc.

Monomer (b1):

The monomer (b1) is a (meth)acrylate having no $R^f$ group and having a $C_{12-30}$ alkyl group. When the number of carbon atoms in the alkyl group is at least the lower limit value in the above range, the water/oil repellent article will be excellent in washing durability and heavy-rain durability. When the number of carbon atoms in the alkyl group is at most the upper limit value in the above range, handling in polymerization operation will be easy, and it is possible to obtain a fluorinated polymer in good yield.

The number of carbon atoms in the alkyl group of the monomer (b1) is, from such a viewpoint that the washing durability and heavy-rain durability of the water/oil repellent article will be further improved, preferably from 20 to 30, more preferably from 20 to 24.

Specific examples of the monomer (b1) may be stearyl (meth)acrylate, behenyl (meth)acrylate, icosyl (meth)acrylate, etc.

Monomer (b2):

The monomer (b2) is a halogenated olefin.

When the fluorinated polymer has structural units based on the monomer (b2), the adhesion between the fluorinated polymer and the substrate will be excellent, whereby the washing durability and heavy-rain durability of the water/oil repellent article will be further excellent.

The monomer (b2) is preferably a chlorinated olefin or a fluorinated olefin.

The monomer (b2) is, from such a viewpoint that the adhesion of the fluorinated polymer and the substrate will be excellent, preferably vinyl chloride, vinylidene chloride, tetrafluoroethylene or vinylidene fluoride, more preferably vinyl chloride or vinylidene chloride.

Monomer (c):

The monomer (c) is a monomer having a crosslinkable functional group.

When the fluorinated polymer has structural units based on the monomer (c), the water/oil repellent article will be further excellent in washing durability and heavy-rain durability.

The crosslinkable functional group is preferably a functional group having at least one bond among a covalent bond, an ionic bond and a hydrogen bond, or a functional group capable of forming a crosslinked structure by interaction of such bonds.

As the functional group, from such a viewpoint that the washing durability and heavy-rain durability of the water/oil repellent article will be excellent, preferred is an isocyanate group, a blocked isocyanate group, an alkoxysilyl group, an amino group, an alkoxymethylamide group, a silanol group, an ammonium group, an amide group, an epoxy group, a hydroxy group, an oxazoline group, a carboxy group, an alkenyl group, a sulfonic acid group, etc. In particular, an epoxy group, a hydroxy group, a blocked isocyanate group, an alkoxysilyl group, an amino group, or a carboxy group is preferred.

The monomer (c) is preferably a (meth)acrylate, an acrylamide, a vinyl ether, or a vinyl ester.

As a specific example of the monomer (c), N-methylol (meth)acrylamide, N-butoxymethyl (meth)acrylamide, 2-hydroxyethyl (meth)acrylate, 4-hydroxybutyl (meth)acrylate, a 3,5-dimethylpyrazole adduct of 2-isocyanatoethyl (meth)acrylate, a 3,5-dimethylpyrazole adduct of 3-isocyanatopropyl (meth)acrylate, diacetone acrylamide, glycidyl methacrylate, glycerol (meth)acrylate, a polycaprolactone ester of hydroxyethyl (meth)acrylate, phenyl glycidyl ethyl acrylate tolylene diisocyanate (AT-600, manufactured by Kyoeisha Chemical Co., Ltd.) or 3-(methyl ethyl ketoxime) isocyanatomethyl-3,5,5-trimethyl cyclohexyl (2-hydroxyethyl methacrylate) cyanate (TEC coat HE-6P, manufactured by Kyokenkasei K.K.) is more preferred from such a viewpoint that the washing durability and heavy-rain durability of the water/oil repellent article will be further excellent. Among them, N-methylol (meth)acrylamide, 2-hydroxyethyl (meth)acrylate, 4-hydroxybutyl (meth)acrylate, a 3,5-dimethylpyrazole adduct of 2-isocyanatoethyl (meth)acrylate, or a 3,5-dimethylpyrazole adduct of 3-isocyanatopropyl (meth)acrylate, or 3-chloro-2-hydroxypropyl (meth)acrylate is particularly preferred.

Monomer (d):

The monomer (d) is a monomer other than the monomer (a), the monomer (b1), the monomer (b2) and the monomer (c).

As the monomer (d), the following compounds may be mentioned.

Methyl (meth)acrylate, ethyl (meth)acrylate, propyl (meth)acrylate, butyl (meth)acrylate, cyclohexyl (meth)acrylate, 2-ethylhexyl (meth)acrylate, n-hexyl (meth)acrylate, vinyl acetate, vinyl propionate, butene, isoprene, butadiene, ethylene, propylene, vinyl ethylene, pentene, ethyl-2-propylene, butyl ethylene, cyclohexyl propyl ethylene, decyl ethylene, dodecyl ethylene, hexene, isohexyl ethylene, neopentyl ethylene, a vinyl alkyl ether such as (1,2-diethoxycarbonyl) ethylene, (1,2-dipropoxycarbonyl) ethylene, methoxyethylene, ethoxyethylene or butoxy ethylene, 2-methoxypropylene, pentyl oxyethylene, cyclopentanoyloxy ethylene, cyclopentyl acetoxy ethylene, styrene, α-methyl styrene, p-methyl styrene, hexyl styrene, octyl styrene, nonyl styrene, chloroprene.

N,N-Dimethyl (meth)acrylamide, vinyl alkyl ketone, benzyl (meth)acrylate, octyl (meth)acrylate, decyl methacrylate, cyclododecyl acrylate, 3-ethoxypropyl acrylate, methoxybutyl acrylate, 2-ethyl butyl acrylate, 1,3-dimethylbutyl acrylate, 2-methylpentyl acrylate, aziridinyl ethyl (meth)acrylate, 2-ethylhexyl polyoxyalkylene (meth)acrylate, polyoxyalkylene di(meth)acrylate.

Crotonic acid alkyl esters, maleic acid alkyl esters such as dioctyl maleate, fumaric acid alkyl esters, citraconic acid alkyl esters, mesaconic acid alkyl esters, triallyl cyanurate, allyl acetate, N-vinyl carbazole, maleimide, N-methyl maleimide, a (meth)acrylate having silicone in its side chain, a (meth)acrylate having a urethane bond, a (meth)acrylate having a polyoxyalkylene chain with a $C_{1-4}$ alkyl group at its terminal, alkylene di(meth)acrylates, etc.

As the fluorinated polymer, one having structural units based on the following monomer (a) and structural units based on the following monomer (b) is preferred from such a viewpoint that the water/oil repellent article will be excellent in the water and oil repellency, washing durability and heavy-rain durability.

Monomer (a): a (meth)acrylate having a $C_{4-6}$ $R^F$ group.

Monomer (b): at least one member selected from the group consisting of behenyl (meth)acrylate, stearyl (meth)acrylate, vinyl chloride and vinylidene chloride.

The proportion of structural units based on the monomer (a) is, from such a viewpoint that the water/oil repellent article will be excellent in the water and oil repellency, preferably from 5 to 80 mass %, more preferably from 10 to 80 mass %, in structural units (100 mass %) based on all monomers constituting the fluorinated polymer.

The proportion of structural units based on the monomer (b1) is, from such a viewpoint that the water/oil repellent article will be excellent in the water and oil repellency, washing durability and heavy-rain durability, preferably from 0 to 95.0 mass %, more preferably from 0.1 to 90.0 mass %, further preferably from 3 to 89.0 mass %, most preferably from 3 to 86.9 mass %, in structural units (100 mass %) based on all monomers constituting the fluorinated polymer.

The proportion of structural units based on the monomer (b2) is, from such a viewpoint that the water/oil repellent article will be excellent in the water and oil repellency, and durability, preferably from 0 to 50 mass %, more preferably from 1 to 45 mass %, further preferably from 3 to 35 mass %, in structural units (100 mass %) based on all monomers constituting the fluorinated polymer.

The proportion of structural units based on the monomer (c) is, from such a viewpoint that the water/oil repellent article will be excellent in the water and oil repellency, washing durability and heavy-rain durability, preferably from 0 to 20 mass %, more preferably from 0.1 to 10 mass %, in structural units (100 mass %) based on all monomers constituting the fluorinated polymer.

The proportion of structural units based on the monomer (d) is, from such a viewpoint that the water/oil repellent article will be excellent in the water and oil repellency, washing durability and heavy-rain durability, preferably from 0 to 35 mass %, more preferably from 0 to 20 mass %, in structural units (100 mass %) based on all monomers constituting the fluorinated polymer.

The proportion of structural units based on a monomer in the present invention is calculated based on the supplied amount of the monomer during production of the fluorinated polymer.

Mw of the fluorinated polymer is preferably from 8,000 to 1,000,000, more preferably from 10,000 to 800,000. When Mw is within the above range, it is possible sufficiently exhibit both water repellency and oil repellency.

Mn of the fluorinated polymer is preferably from 3,000 to 800,000, more preferably from 5,000 to 600,000. When Mn is within the above range, it is possible to sufficiently exhibit both water repellency and oil repellency.

(Fluorinated Ether Compound)

The fluorinated ether compound is a compound having a perfluoropolyether chain composed of a plurality of oxyperfluoroalkylene units.

As the fluorinated ether compound, a compound (5) is preferred from the viewpoint of washing durability of the water repellency and friction durability of the water repellency of the water/oil repellent article.

$$A\text{-}U\text{—}W\text{—}V\text{—}B \tag{5}$$

A and B are each independently —CF$_3$, —OH, —C(O)OCH$_3$, —C(O)OH or a hydrolyzable silyl group (but excluding a case where both of A and B become —C(O)OH). As A and B, from the viewpoint of washing durability and friction durability, —CF$_3$ or COOCH$_3$ is preferred, and —CF$_3$ is more preferred.

The hydrolyzable silyl group is preferably —Si(OCH$_3$)$_3$, —SiCH$_3$(OCH$_3$)$_2$, —Si(OCH$_2$CH$_3$)$_3$, —SiCl$_3$, —Si(OCOCH$_3$)$_3$ or —Si(NCO)$_3$. From the viewpoint of the handling efficiency in the production, —Si(OCH$_3$)$_3$ is particularly preferred.

U is a divalent organic group which may have fluorine atom(s), an oxygen atom (provided only when A is CF$_3$—), or a single bond. The divalent organic group may be —CH$_2$CF$_2$O—, —CH$_2$CF$_2$CF$_2$O—, —CH$_2$CF$_2$CF$_2$CF$_2$O—, etc.

V is a divalent organic group which may have fluorine atom(s), or a single bond (provided only when B is —CF$_3$). The divalent organic group may be —CF$_2$CH$_2$—, —CF$_2$CF$_2$CH$_2$—, —CF$_2$CF$_2$CF$_2$CH$_2$—, —CF$_2$—, —CF$_2$CF$_2$—, —CF$_2$CF$_2$CF$_2$—, —CF$_2$CF$_2$CF$_2$C(O)NH(CH$_2$)$_3$—, —CF$_2$CF$_2$CF$_2$(CH$_2$)$_2$—, —CF$_2$CF$_2$CF$_2$(CH$_2$)$_3$—, —(CH$_2$)$_3$—, —CF$_2$CF$_2$CF$_2$CH$_2$O(CH$_2$)$_3$—, etc.

W is the following group (6).

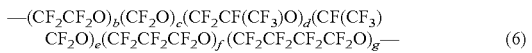

$$—(CF_2CF_2O)_b(CF_2O)_c(CF_2CF(CF_3)O)_d(CF(CF_3)CF_2O)_e(CF_2CF_2CF_2O)_f(CF_2CF_2CF_2CF_2O)_g— \tag{6}$$

where b, c, d, e, f and g are each independently an integer of from 0 to 180, and b+c+d+e+f+g is an integer of from 5 to 400.

Further, the order of binding of the oxyperfluoroalkylene units is not limited, and it may be random, may be block, or may be alternating. Further, in a case where the compound (5) is a mixture of compounds of the same type differing only in the number of oxyperfluoroalkylene units, b, c, d, e, f and g are represented by average values.

As the compound (5), from the viewpoint of excellent washing durability of the water repellency and friction durability of the water repellency of the water/oil repellent article, compounds represented by the following formulae (5-a) to (5-e) are preferred.

$$A_1\text{-}U_1\text{—}(CF_2CF_2O)_b(CF_2O)_c\text{—}V_1\text{—}B_1 \tag{5-a}$$

where b+c=5 to 200, A$_1$ is —CF$_3$ or —OH, U$_1$ is —O— or —CH$_2$CF$_2$O—, V$_1$ is a single bond, —CF$_2$CH$_2$— or —CF$_2$—, and B$_1$ is —CF$_3$, —OH or —C(O)OCH$_3$.

$$A_2\text{-}U_2\text{—}(CF(CF_3)CF_2O)_e(CF_2O)_c\text{—}V_2\text{—}B_2 \tag{5-b}$$

where e+c=5 to 100, A$_2$ is —CF$_3$, U$_2$ is —O—, V$_2$ is a single bond, and B$_2$ is —CF$_3$.

$$A_3\text{-}U_3\text{—}(CF_2CF_2O)_b(CF(CF_3)CF_2O)_e\text{—}V_3\text{—}B_3 \tag{5-c}$$

where b+e=5 to 100, A$_3$ is —CF$_3$, U$_3$ is a single bond, V$_3$ is —CF$_2$—, and B$_3$ is —CF$_3$.

$$A_4\text{-}U_4\text{—}(CF_2CF_2O)_b(CF_2CF_2CF_2O)_f\text{—}V_4\text{—}B_4 \tag{5-d}$$

where b+f=5 to 100, A$_4$ is —CF$_3$, U$_4$ is a single bond, V$_4$ is —CF$_2$—, and B$_4$ is —CF$_3$.

$$A_5\text{-}U_5\text{—}(CF_2CF_2O)_b(CF_2CF_2CF_2CF_2O)_x\text{—}V_5\text{—}B_5 \tag{5-e}$$

where b+x=1 to 400, A$_5$ is —CF$_3$, U$_5$ is —O—, V$_5$ is —CF$_2$CF$_2$CF$_2$—, —CF$_2$CF$_2$CF$_2$C(O)NH(CH$_2$)$_3$—, —CF$_2$CF$_2$CF$_2$(CH$_2$)$_2$—, or —CF$_2$CF$_2$CF$_2$(CH$_2$)$_3$—, and B$_5$ is —C(O)OCH$_3$ or —Si(OCH$_3$)$_3$.

Specific examples of the compound (5) are, from the viewpoint of washing durability of the water repellency and friction durability of the water repellency of the water/oil repellent article, preferably the compound (5-1) (manufactured by Solvay, Fomblin (trade name) M03, M15, M60, M100, etc.), the compound (5-2) (manufactured by Solvay, Fomblin (trade name) D2, Fluorolink (trade name) D4000, etc.), the compound (5-3) (manufactured by Solvay, Fomblin (trade name) YR1800, etc.), the compound (5-4) (manufactured by DuPont, Krytox (trade name) series), the compound (5-5) (manufactured by Daikin Industries, Ltd., Demnum (trade name) S20, S65, S200, etc.), the compound (5-6), the compound (5-7), the compound (5-8), the compound (5-9), the compound (5-10), the compound (5-11), and the compound (5-12).

$$CF_3\text{—}O\text{—}[(CF_2CF_2O)_b(CF_2O)_c]\text{—}CF_3 \text{ } (b+c=40 \text{ to } 180, b/c=0.5 \text{ to } 2) \tag{5-1}$$

$$HO\text{—}CH_2CF_2O\text{—}[(CF_2CF_2O)_b(CF_2O)_c]\text{—}CF_2CH_2\text{—}OH \text{ } (b+c=40 \text{ to } 180, b/c=0.5 \text{ to } 2) \tag{5-2}$$

$$CF_3\text{—}O\text{—}[(CF(CF_3)CF_2O)_e(CF_2O)_c]\text{—}CF_3 \text{ } (e+c=8 \text{ to } 45, e/c=20 \text{ to } 1,000) \tag{5-3}$$

$$CF_3\text{—}CF_2CF_2O(CF(CF_3)CF_2O)_{e-1}\text{—}CF_2\text{—}CF_3 \text{ } (e=10 \text{ to } 60) \tag{5-4}$$

$$CF_3\text{—}CF_2CF_2O(CF_2CF_2CF_2O)_f\text{—}CF_2\text{—}CF_3 \text{ } (f=10 \text{ to } 60) \tag{5-5}$$

$$CF_3\text{—}O\text{—}(CF_2CF_2OCF_2CF_2CF_2CF_2O)_xCF_2CF_2O\text{—}CF_2CF_2CF_2\text{—}C(O)OCH_3 \text{ } (x=2 \text{ to } 199) \tag{5-6}$$

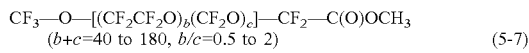

CF$_3$—O—[(CF$_2$CF$_2$O)$_b$(CF$_2$O)$_c$]—CF$_2$—C(O)OCH$_3$
(b+c=40 to 180, b/c=0.5 to 2)    (5-7)

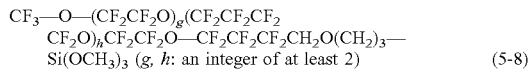

CF$_3$—O—(CF$_2$CF$_2$O)$_g$(CF$_2$CF$_2$CF$_2$
CF$_2$O)$_h$CF$_2$CF$_2$O—CF$_2$CF$_2$CF$_2$CH$_2$O(CH$_2$)$_3$—
Si(OCH$_3$)$_3$ (g, h: an integer of at least 2)    (5-8)

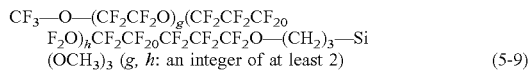

CF$_3$—O—(CF$_2$CF$_2$O)$_g$(CF$_2$CF$_2$CF$_2$O
F$_2$O)$_h$CF$_2$CF$_2$OCF$_2$CF$_2$CF$_2$O—(CH$_2$)$_3$—Si
(OCH$_3$)$_3$ (g, h: an integer of at least 2)    (5-9)

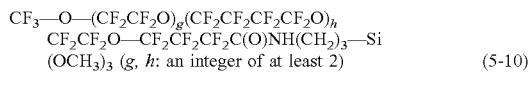

CF$_3$—O—(CF$_2$CF$_2$O)$_g$(CF$_2$CF$_2$CF$_2$CF$_2$O)$_h$
CF$_2$CF$_2$O—CF$_2$CF$_2$CF$_2$C(O)NH(CH$_2$)$_3$—Si
(OCH$_3$)$_3$ (g, h: an integer of at least 2)    (5-10)

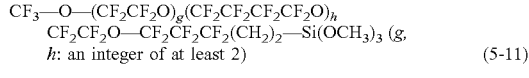

CF$_3$—O—(CF$_2$CF$_2$O)$_g$(CF$_2$CF$_2$CF$_2$CF$_2$O)$_h$
CF$_2$CF$_2$O—CF$_2$CF$_2$CF$_2$(CH$_2$)$_2$—Si(OCH$_3$)$_3$ (g,
h: an integer of at least 2)    (5-11)

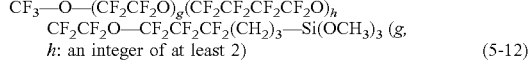

CF$_3$—O—(CF$_2$CF$_2$O)$_g$(CF$_2$CF$_2$CF$_2$CF$_2$O)$_h$
CF$_2$CF$_2$O—CF$_2$CF$_2$CF$_2$(CH$_2$)$_3$—Si(OCH$_3$)$_3$ (g,
h: an integer of at least 2)    (5-12)

Mn of the fluorinated ether compound is preferably from 1,000 to 50,000. When Mn of the fluorinated ether compound is within the above range, the water/oil repellent article will be further excellent in washing durability of the water repellency and friction durability of the water repellency.

The water/oil repellent article of the present invention as described above has the fluorinated polymer having structural units based on the monomer (a) having a $C_{1-6}$ perfluoroalkyl group, whereby its environmental load is less, and it is excellent in water and oil repellency. Moreover, it further has the fluorinated ether compound, whereby the fluorinated ether compound reduces the load on the fluorinated polymer caused by friction of the fibers one another at the time of the washing or friction, and it will be excellent in washing durability of the water repellency and friction durability of the water repellency. Further, if the fluorinated polymer further has structural units based on the monomer (b1) or structural units based on the monomer (b2), it will be excellent also in heavy-rain durability.

<Method for Producing Water/Oil Repellent Article>

The water/oil repellent article of the present invention is produced by a method of letting the above-described specific fluorinated polymer and fluorinated ether compound be adhered on a substrate.

The production method of the present invention may be the following single-stage processing or two-stage processing, and the two-stage processing is preferred from such a viewpoint that the water and oil repellency of the oil/water repellent article, washing durability of the water repellency and friction durability of the water repellency can be further improved.

Single-stage processing: a method of treating a substrate with a water/oil repellent composition comprising the fluorinated polymer and fluorinated ether compound, to let the fluorinated polymer and fluorinated ether compound be adhered to the substrate.

Two-stage processing: a method of treating a substrate with a first liquid containing the fluorinated polymer, and treating the substrate treated with the first liquid, with a second liquid containing the fluorinated ether compound, to let the fluorinated polymer and fluorinated ether compound be adhered to the substrate.

(Single-Stage Processing)

As the water/oil repellent composition, the later-described water/oil repellent composition is employed.

The method of treating a substrate with the water/oil repellent composition may, for example, be a method of applying the water/oil repellent composition to a substrate by coating, spraying or dipping, followed by drying the substrate.

The amount of the fluorinated ether compound in the water/oil repellent composition is, to 100 parts by mass of the fluorinated polymer in the water/oil repellent composition, preferably from 0.1 to 100 parts by mass, from the viewpoint of friction durability of the water repellency, more preferably from 5 to 100 parts by mass, further preferably from 30 to 100 parts by mass, from the viewpoint of washing durability of the water repellency. When the amount of the fluorinated ether compound is within the above range, the water/oil repellent article will be excellent in the water and oil repellency and in the balance between washing durability of the water repellency and friction durability of the water repellency.

(Two-Stage Processing)

As the first liquid, the same one as the first liquid in the later-described water/oil repellent kit is employed. Further, as the second liquid, the same one as the second liquid in the later-described water/oil repellent kit is employed.

The first-stage treating method in the two-stage processing may, for example, be a method of applying the first liquid to a substrate by coating, spraying or dipping, followed by drying.

The second-stage treating method in the two-stage processing may, for example, be a method of applying the second liquid to the substrate treated with the first liquid, by coating, spraying or dipping, followed by drying.

The amount of fluorinated ether compound in the second liquid is, to 100 parts by mass of the fluorinated polymer in the first liquid, preferably from 0.1 to 100 parts by mass from the viewpoint of friction durability of the water repellency, more preferably from 5 to 100 parts by mass, further preferably from 30 to 100 parts by mass from the viewpoint of washing durability of the water repellency. When the amount of the fluorinated ether compound is within the above range, the water/oil repellent article will be excellent in the water and oil repellency and in the balance between washing durability of the water repellency and friction durability of the water repellency.

<Water/Oil Repellent Composition>

The water/oil repellent composition of the present invention comprises the above-described specific fluorinated polymer and specific fluorinated ether compound. The water/oil repellent composition of the present invention may, as the case requires, contain a medium, a surfactant and/or additives.

In the water/oil repellent composition of the present invention, from such a viewpoint that the environmental load will be less, it is preferred that the fluorinated polymer and fluorinated ether compound are dispersed as particles in a medium.

At the time of being used in the above-described single-stage processing, the solid content concentration in the water/oil repellent composition of the present invention is preferably from 0.2 to 7 mass %, more preferably from 0.2 to 5 mass %, in the water/oil repellent composition (100 mass %).

(Medium)

As the medium, water, alcohols, glycols, glycol ethers, glycol esters, halogenated compounds, hydrocarbons, ketones, esters, ethers, nitrogen compounds, etc. may be mentioned, and from the viewpoint of the solubility and handling efficiency, at least one medium selected from the group consisting of water, alcohols, glycols, glycol ethers and glycol esters is preferred.

As the medium, one type may be used alone, or two or more types may be used as mixed. When two or more types of media are to be used as mixed, it is preferred to use water and other media as mixed. By using mixed media, it becomes easy to control the solubility or dispersibility of the fluorinated polymer, whereby it becomes easy to control the permeability, wettability, solvent drying rate, etc. to the substrate during the processing.

The water/oil repellent composition of the present invention, when made to be a composition containing the fluorinated polymer in an amount of 20 mass %, preferably contains a medium or media other than water in an amount of preferably from 0 to 40 mass %, more preferably from 1 to 20 mass %.

(Surfactant)

The surfactant may be a hydrocarbon type surfactant or a fluorinated surfactant, and each may be an anionic surfactant, nonionic surfactant, cationic surfactant or amphoteric surfactant.

As the surfactant, from the viewpoint of the compatibility with additives, it is preferred to use a nonionic surfactant and an amphoteric surfactant in combination, and from the viewpoint of the stability of the fluorinated polymer, it is preferred to use a nonionic surfactant alone, or to use a nonionic surfactant and a cationic surfactant in combination.

The ratio of the nonionic surfactant to the cationic surfactant (nonionic surfactant/cationic surfactant) is preferably from 97/3 to 40/60 (mass ratio).

The nonionic surfactant is preferably at least one member selected from the group consisting of surfactants s1 to s6 disclosed in WO2010/047258, WO2010/123042, and amidoamine surfactants disclosed in Japanese Patent No. 5569614.

When the surfactant contains a cationic surfactant, as such a cationic surfactant, surfactant s7 disclosed in WO2010/047258, WO2010/123042 is preferred.

When the surfactant contains an amphoteric surfactant, as such an amphoteric surfactant, surfactant s8 disclosed in WO2010/047258, WO2010/123042 is preferred.

Further, as the surfactant, surfactant s9 (polymeric surfactant) disclosed in WO2010/047258, WO2010/123042 may be used.

The preferred embodiment of the surfactant is similar to the preferred embodiment disclosed in WO2010/047258, WO2010/123042.

As preferred specific examples of the nonionic surfactant, the following may be mentioned.

$C_{18}H_{37}O[CH_2CH(CH_3)O]_2-(CH_2CH_2O)_{30}H$ $C_{18}H_{35}O-(CH_2CH_2O)_{26}H$ $C_{18}H_{35}O-(CH_2CH_2O)_{30}H$ $C_{18}H_{35}O-(CH_2O)_{13}H$ $C_{18}H_{37}O-(CH_2CH_2O)_{50}H$ $C_{16}H_{33}O[CH_2CH(CH_3)O]_5-(CH_2CH_2O)_{20}H$ $C_{12}H_{25}O[CH_2CH(CH_3)O]_2-(CH_2CH_2O)_{15}H$ $(C_8H_{17})(C_6H_{13})CHO-(CH_2CH_2O)_{15}H$ $C_{10}H_{21}O[CH_2CH(CH_3)O]_2-(CH_2CH_2O)_{15}H$ $C_6F_{13}CH_2CH_2-(CH_2O-(CH_2H_2O)_{15}H$ $C_6F_{13}CH_2CH_2O[CH_2CH(CH_3)O]_2-(CH_2CH_2O)_{15}H$ $C_4F_9CH_2CH_2O[CH_2CH(CH_3)O]_2-(CH_2CH_2O)_{15}H$ $HO-(CH_2CH_2O)_{15}-(C_3H_6O)_{35}-(CH_2CH_2O)_{15}H$ $HO-(CH_2CH_2O)_8-(C_3H_6O)_{35}-(CH_2CH_2O)_8H$ $HO-(CH_2CH_2O)_9-(C_3H_6O)_{20}-(CH_2CH_2O)_9H$ $HO-(CH_2CH_2O)_{45}-(C_3H_6O)_{17}-(CH_2CH_2O)_{45}H$ $HO-(CH_2CH_2O)_{34}-(CH_2CH_2CH_2CH_2O)_{28}-(CH_2CH_2O)_{34}$

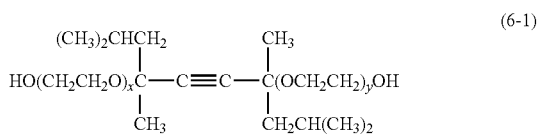

(6-1)

where x and y are each independently an integer of from 0 to 100.

As the compound (6-1), preferred is a compound wherein x and y are 0, a compound wherein the sum of x and y is from 1 to 4 on average, or a compound wherein the sum of x and y is from 10 to 30 on average.

As preferred specific examples of the cationic surfactant, stearyl trimethyl ammonium chloride, stearyl dimethyl monoethyl ammonium ethyl sulfate, stearyl monomethyl di(polyethylene glycol) ammonium chloride, fluorohexyl trimethyl ammonium chloride, di(tallow alkyl) dimethyl ammonium chloride, dimethyl mono coconut amine acetate, an amidoamine quaternary ammonium salt disclosed in Japanese Patent No. 5569614, etc. may be mentioned.

As preferred specific examples of the amphoteric surfactant, dodecyl betaine, stearyl betaine, dodecyl carboxymethyl hydroxyethyl imidazolinium betaine, dodecyl dimethylamino acetic acid betaine, fatty acid amidopropyl dimethylamino acetic acid betaine, etc. may be mentioned.

The total amount of the surfactant is, to the fluorinated polymer (100 parts by mass), preferably from 1 to 10 parts by mass, more preferably from 2 to 8 parts by mass.

(Additives)

The additives may be a penetrant (a non-ionic surfactant with a bilaterally symmetric structure having an acetylene group at the center, DISPANOL series manufactured by NOF CORPORATION, etc.), an antifoaming agent (OLFINE series manufactured by Nissin Chemical Industry Co., Ltd., FS Antifoam series manufactured by Dow Corning Toray Co., Ltd., etc.), a water-absorbing agent, an antistatic agent (Delectol series manufactured by Meisei Chemical Works, Ltd., etc.), an anti-wrinkle agent, a texture modifier, a coalescing aid, a water-soluble polymer (a hydrophilic polyester and its derivatives, a hydrophilic polyethylene glycol and its derivatives, a polyacrylamide, a polyvinyl alcohol, etc.), colloidal silica (SNOWTEX (trade name) series manufactured by Nissan Chemical Industries, Ltd., ADELITE series manufactured by ADEKA Corporation, etc.), a pH adjusting agent (diethanolamine, triethanolamine, acetic acid, citric acid, etc.), a crosslinking agent, a heat-curing catalyst, a crosslinking catalyst, a synthetic resin, a fiber stabilizer, a non-fluorinated water repellant, a fluorinated copolymer other than the above-described fluorinated copolymer, etc.

As the crosslinking agent, preferred is at least one crosslinking agent selected from the group of an isocyanate type, a melamine type, a carbodiimide type and an oxazoline type.

Specific examples of the isocyanate type crosslinking agent may be an aromatic block type isocyanate, an aliphatic block type isocyanate, an aromatic non-block type isocyanate, an aliphatic non-block type isocyanate, etc. These isocyanate crosslinking agents are preferably of a water dispersible type emulsified by a surfactant, or of a self-water dispersible type having a hydrophilic group.

The melamine-type crosslinking agent may be a condensate or precondensate of urea or melamine formaldehyde, methylol-dihydroxy ethylene-urea or its derivatives, urone, methylol-ethylene-urea, methylol-propylene-urea, methylol-triazone, dicyandiamide-formaldehyde condensate, methylol-carbamate, methylol-(meth)acrylamide, polymers thereof, etc.

The carbodiimide-type crosslinking agent is a polymer having carbodiimide groups in the molecule, and is a crosslinking agent showing excellent reactivity with carboxy groups, amino groups or active hydrogen groups in the substrate or in the water/oil repellent composition.

The oxazoline-type crosslinking agent is a polymer having oxazoline groups in the molecule, and is a crosslinking agent showing excellent reactivity with carboxy groups in the substrate or in the water/oil repellent composition.

Further, other crosslinking agents may be divinylsulfone, polyamide or its cationic derivatives, polyamine or its cationic derivatives, an epoxy derivative such as diglycidyl glycerol, a halide derivative such as (epoxy-2,3-propyl) trimethylammonium chloride, N-methyl-N-(epoxy-2,3-propyl) morpholinium chloride, etc., isophthalic acid dihydrazide, adipic acid dihydrazide, sebacic acid dihydrazide, dodecanedioic acid dihydrazide, 1,6-hexamethylene bis(N, N-dimethyl semicarbazide), 1,1,1',1'-tetramethyl-4,4'-(methylene-di-para-phenylene)disemicarbazide, spiro glycol, a pyridinium salt of chloromethyl ether of ethylene glycol, a polyamine-polyamide-epichlorohydrin resin, polyvinyl alcohol or its derivatives, polyacrylamide or its derivatives, a glyoxal resin type anticrease agent, etc.

In a case where a melamine-type crosslinking agent or a glyoxal resin type anticrease agent is to be incorporated to the water/oil repellent composition of the present invention, it is preferred to have a catalyst incorporated. As a preferred catalyst, an inorganic amine salt or an organic amine salt may be mentioned. The inorganic amine salt may be ammonium chloride, etc. The organic amine salt may be amino alcohol hydrochloride, semicarbazide hydrochloride, etc. The amino alcohol hydrochloride may be monoethanolamine hydrochloride, diethanolamine hydrochloride, triethanolamine hydrochloride, 2-amino-2-methylpropanol hydrochloride, etc.

(Method for Producing Water/Oil Repellent Composition)

The water/oil repellent composition of the present invention can be produced, for example, by mixing the fluorinated polymer composition and the fluorinated ether composition, and, as the case requires, adding the above additives.

(Fluorinated Polymer Composition)

The fluorinated polymer composition comprises the fluorinated polymer, a medium, a surfactant and, as the case requires, additives. The fluorinated polymer composition to be used for the production of the water/oil repellent composition of the present invention is preferably an emulsion of the fluorinated polymer, from such a viewpoint that the environmental load will be less.

The fluorinated polymer composition can be produced, for example, by the following method (i) or method (ii).

Method (i): a method wherein in the presence of a surfactant and a polymerization initiator, monomer components comprising the monomer (a) and, as a case requires, at least one monomer member selected from the group consisting of the monomer (b1), the monomer (b2), the monomer (c) and the monomer (d), are polymerized in a medium to obtain a solution, dispersion or emulsion of the fluorinated polymer, and then, as the case requires, other media, other surfactants and/or additives are added.

Method (ii): a method wherein in the presence of a surfactant and a polymerization initiator, monomer components comprising the monomer (a) and, as a case requires, at least one monomer member selected from the group consisting of the monomer (b1), the monomer (b2), the monomer (c) and the monomer (d), are polymerized in a medium to obtain a solution, dispersion or emulsion of the fluorinated polymer, then the fluorinated polymer is separated, and to the fluorinated polymer, a medium, a surfactant and, as the case requires, additives are added.

As the polymerization method, a dispersion polymerization method, an emulsion polymerization method, a suspension polymerization method, etc. may be mentioned.

As the method for producing the fluorinated polymer composition, a method is preferred wherein in the presence of a surfactant and a polymerization initiator, the monomer components are emulsion-polymerized in an aqueous medium to obtain an emulsion of the fluorinated polymer. From such a viewpoint that the yield of the fluorinated polymer will be improved, it is preferred to pre-emulsify a mixture comprising the monomer components, a surfactant and an aqueous medium before the emulsion polymerization. For example, a mixture comprising the monomer components, a surfactant and an aqueous medium, is mixed and dispersed by a homomixer or a high pressure emulsifier.

As the polymerization initiator, a thermal polymerization initiator, a photopolymerization initiator, a radiation polymerization initiator, a radical polymerization initiator, an ionic polymerization initiator, etc. may be mentioned, and a water-soluble or oil-soluble radical polymerization initiator is preferred. As the radical polymerization initiator, a general purpose initiator such as an azo polymerization initiator, a peroxide polymerization initiator or a redox initiator is used depending on the polymerization temperature. As the radical polymerization initiator, an azo compound is particularly preferred, and in a case where the polymerization is carried out in an aqueous medium, a salt of an azo compound is more preferred. The polymerization temperature is preferably from 20 to 150° C.

At the time of the polymerization of monomer components, a molecular weight modifier may be used. As the molecular weight modifier, an aromatic compound, a mercapto alcohol or a mercaptan is preferred, and an alkyl mercaptan is particularly preferred. As the molecular weight modifier, mercaptoethanol, mercapto glycerol, n-octyl mercaptan, n-dodecyl mercaptan, t-dodecyl mercaptan, stearyl mercaptan, α-methylstyrene dimer ($CH_2$=$C(Ph)CH_2C$ $(CH_3)_2Ph$, where Ph is a phenyl group), etc. may be mentioned.

The proportions of the monomers (a) to (d) are, since residual monomers after the polymerization will hardly be detected, the same as the above-mentioned proportions of the structural units based on the monomers (a) to (d). The preferred proportions are also the same.

In the fluorinated polymer composition, it is preferred that the fluorinated polymer is dispersed as particles in the medium. The average particle size of the fluorinated polymer is preferably from 10 to 1,000 nm, more preferably from 10 to 500 nm, particularly preferably from 50 to 300 nm. When the average particle size is within such a range, it is not necessary to use a surfactant or the like in a large amount, and the water and oil repellency will be good, whereby when a dyed fabric or the like is treated, no color fading will occur, and in the medium, the dispersed particles can exist stably without precipitation. In the present invention, the average particle size of the fluorinated polymer is measured by a dynamic light scattering apparatus.

The solid content concentration of the fluorinated polymer composition is preferably from 25 to 40 mass % in the fluorinated polymer composition (100 mass %), immediately after its production.

(Fluorinated Ether Composition)

The fluorinated ether composition comprises the fluorinated ether compound and a medium. As the fluorinated ether composition, a solution or dispersion of the fluorinated ether compound may be mentioned. As the fluorinated ether composition to be used for the production of the water/oil repellent composition, from such a viewpoint that it can be applied to a substrate with a less environmental load, an aqueous dispersion of the fluorinated ether compound is preferred. The aqueous dispersions of the fluorinated ether compound may be prepared, for example, by mixing and dispersing a mixture comprising the fluorinated ether compound, a surfactant and an aqueous medium by a homomixer or a high pressure emulsifier.

The medium in the fluorinated ether composition may be water, an organic solvent such as an alcohol, a ketone, an ester or an ether, a fluorinated solvent, or a mixed solvent thereof. As the medium in the fluorinated ether composition, from such a viewpoint that the environmental load is less, water is preferred, and from the viewpoint of the miscibility with the fluorinated polymer composition, it is preferred to select one readily miscible with the medium contained in the fluorinated polymer composition.

<Water/Oil Repellent Kit>

The water/oil repellent kit comprises a first container accommodating a first liquid containing the above-described specific fluorinated polymer, and a second container accommodating a second liquid containing the fluorinated ether compound.

(First Liquid)

The first liquid may be the above-described fluorinated polymer composition. As the first liquid, from such a viewpoint that it can be applied to a substrate with a less environmental load, an emulsion of the fluorinated polymer obtained by emulsion polymerization is preferred.

At the time of using the first liquid in the first stage of the above-described two stage processing, it is preferred to further dilute the first liquid consisting of the emulsion of the fluorinated polymer with a medium, and, as the case requires, to add additives.

The solid content concentration of the first liquid is preferably from 25 to 40 mass % in the first liquid (100 mass %) in the state of being accommodated in the first container.

At the time of using in the first stage of the above-described two stage processing, the solid content concentration of the first liquid is preferably from 0.2 to 7 mass %, more preferably from 0.2 to 5 mass %, in the first liquid (100 mass %).

(Second Liquid)

The second liquid may be the above-described fluorinated ether composition. As the second liquid, from the viewpoint of the handling efficiency and easy maintenance of the initial water repellency and oil repellency, a solution of the fluorinated ether compound is preferred.

At the time of using the second liquid in the second stage of the above-described two-stage processing, it is preferred to further dilute the second liquid consisting of a solution of the fluorinated ether compound with a medium.

The medium in the solution of the fluorinated ether compound may be a fluorinated solvent, or a mixed solvent of a fluorinated solvent with an organic solvent such as a ketone, an ester or an ether, and from the viewpoint of the solubility, handling efficiency and non-flammability, a fluorinated solvent is preferred.

The boiling point (normal boiling point) at atmospheric pressure of the fluorinated solvent is preferably at least 50° C., more preferably from 50 to 180° C., further preferably from 50 to 150° C. When the boiling point is at least the lower limit value in the above range, at the time of performing the two-stage processing in the vicinity of room temperature, it is easy to let the fluorinated ether compound be uniformly adhered to the substrate. When the boiling point is at most the upper limit value in the above range, it is easy to dry after having the fluorinated ether compound adhered to the substrate.

As the fluorinated solvent having a boiling point of at least 50° C. at atmospheric pressure, from the viewpoint of efficiency to let the fluorinated ether compound be uniformly adhered to the substrate and the non-flammability, preferred is at least one member selected from the group consisting of 1,1,1,2,2,3,3,4,4,5,5,6,6-tridecafluoro-octane, 1,1,2,2-tetrafluoroethyl-2,2,2-trifluoroethyl ether, 1-methoxy-1,1,2,2,3,3,3-heptafluoropropane, 1-methoxy-1,1,2,2,3,3,4,4,4-nonafluorobutane, 1-ethoxy-1,1,2,2,3,3,4,4,4-nonafluorobutane, 1,1,1,2,2,3,4,5,5,5-decafluoro-3-methoxy-4-trifluoromethyl-pentane, 1,1,1,2,2,3,4,5,5,5-decafluoropentane, poly(1,1,2,3,3,3-hexafluoropropene oxide), 1,3-bistrifluoromethylbenzene, 1,4-trifluoromethylbenzene, trifluorotoluene, perfluorobenzene and perfluorobutylamine.

As commercially available products of the fluorinated solvent having a boiling point of at least 50° C. under atmospheric pressure, AC-6000, AE-3000, AE-3100E manufactured by Asahi Glass Company, Limited; Novec (trade name) 7100, 7200, 7300 manufactured by 3M; Vertrel (trade name) X series manufactured by Du Pont-Mitsui Fluorochemicals Co., Ltd.; SR solvent manufactured by Seimi Chemical Co., Ltd.; Galden (trade name) HT55, HT70, HT80, HT110, HT135 manufactured by Solvay, etc. may be mentioned.

The solid content concentration of the second liquid is preferably from 0.001 to 5 mass % in the second liquid (100 mass %), in the state of being accommodated in the second container. The solid content concentration of the second liquid is, at the time of being used in the second stage of the above described two-stage processing, preferably from 0.001 to 5 mass %, more preferably from 0.1 to 2 mass %, in the second liquid (100 mass %).

EXAMPLES

In the following, the present invention will be described in detail with reference to Examples, but the present invention is not limited thereto.

<Evaluation of Water/Oil Repellent Article>

(Oil Repellency)

With respect to a test cloth, the oil repellency was evaluated in accordance with the test method of AATCC-TM118-1966. The oil repellency was represented by the grades shown in Table 1. One having+(−) attached to a grade indicates that the property is slightly better (worse).

TABLE 1

| Oil repellency No. | Test solution | Surface tension (25° C.) [mN/m] |
|---|---|---|
| 8 | n-Heptane | 19.8 |
| 7 | n-Octane | 21.4 |
| 6 | n-Decane | 23.5 |
| 5 | n-Dodecane | 24.7 |
| 4 | n-Tetradecane | 26.4 |
| 3 | n-Hexadecane | 27.3 |
| 2 | 65 Parts of Nujol/35 parts of hexadecane | 29.6 |
| 1 | Nujol | 31.2 |
| 0 | One less than 1 | — |

(Water Repellency)

With respect to a test cloth, the water repellency was evaluated in accordance with the spray test of JIS L 1092. The water repellency was represented by 5 stage grades of 1 to 5. The larger the grade number, the better the water repellency. One having+(−) attached to a grade indicates that the property is slightly better (worse) as compared with the standard level of the grade.

(Washing Durability of Water Repellency)

With respect to a test cloth, in accordance with the wash method of Annex 103 of JIS L 0217, washing was repeated 5 times or 20 times. After the washing, the test cloth was air-dried overnight in a room at a room temperature of 23° C. under a humidity of 50%, whereupon the water repellency of the test cloth was evaluated.

(Friction Durability of Water Repellency)

By using a friction tester, the friction surface of a test cloth was rubbed 2,000 times or 10,000 times, and then, the test cloth was air-dried overnight in a room at a room temperature of 25° C. under a humidity of 55%, whereupon the water repellency of the friction surface of the test cloth was evaluated.

(Heavy-Rain Durability)

With respect to a test cloth, in accordance with the method (Bundesmann test) disclosed in JIS L 1092 (c) Method, rainfall was conducted under such conditions that the amount of rainfall was 100 cc/min, the water temperature of rainfall was 20° C. and the rainfall time was 10 min., whereupon the water repellency, washing durability of the water repellency and friction durability of the water repellency were evaluated.

<Abbreviations>

(Monomer (a))

C6FMA: $F(CF_2)_6CH_2CH_2OC(O)C(CH_3)=CH_2$ (Monomer (b1))

BeA: behenyl acrylate, STA: stearyl acrylate,

BeMA: behenyl methacrylate (Monomer (b2))

VdCl: vinylidene chloride, VCM: vinyl chloride.

(Monomer (c))

HEMA: 2-hydroxyethyl methacrylate,

MOI-BP: a 3,5-dimethyl pyrazole adduct of 2-isocyanatoethyl methacrylate (Monomer (d))

DOM: maleic acid bis(2-ethylhexyl)

(Surfactant)

PEO-30: 11.3 mass % aqueous solution of polyoxyethylene oleyl ether (about 30 mol ethylene oxide adduct, manufactured by Kao Corporation, EMULGEN E430), PEO-13: polyoxyethylene oleyl ether (about 12.8 mol ethylene oxide adduct, manufactured by Kao Corporation, EMULGEN E420), AGE-10: acetylene glycol ethylene oxide adduct (ethylene oxide addition molar amount: 10 mol, manufactured by Nisshin Chemical Industry Co., Ltd., Surfynol 465), AGE-30: acetylene glycol ethylene oxide adduct (ethylene oxide addition molar amount: 30 mol, manufactured by Nisshin Chemical Industry Co., Ltd., Surfynol 485), EPO-40: ethylene oxide propylene oxide polymer (proportion of ethylene oxide: 40 mass %, manufactured by NOF CORPORATION, PLONON (trade name) 204), ATMAC: 63 mass % water and isopropyl alcohol solution of monostearyl trimethyl ammonium chloride (manufactured by Lion Corporation, LIPOQUAD 18-63)

(Medium)

DPG: dipropylene glycol, Water: deionized water (Molecular Weight Modifier)

StSH: stearyl mercaptan, DoSH: n-dodecyl mercaptan (Polymerization Initiator)

VA-061A: 31 mass % aqueous solution of an acetate of 2,2'-azobis[2-(2-imidazolin-2-yl)propane] (manufactured by Wako Pure Chemical Industries, Ltd., VA-061)

V-50: 2,2'-azobis(2-amidinopropane) dihydrochloride (manufactured by Wako Pure Chemical Industries, Ltd., V-50), V-601: 2,2'-azobis(2-methyl propionate) (manufactured by Wako Pure Chemical Industries, Ltd., V-601)

(Fluorinated Ether Compound)

Compound (5-1): perfluoropolyether (manufactured by Solvay, Fomblin (trade name) M60, number average molecular weight: 18700, polymer terminal structure: $CF_3$)

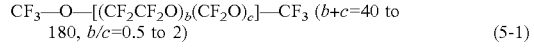

$$CF_3-O-[(CF_2CF_2O)_b(CF_2O)_c]-CF_3 \ (b+c=40 \text{ to } 180, b/c=0.5 \text{ to } 2) \quad (5\text{-}1)$$

Compound (5-2): polyfluoropolyether (manufactured by Solvay, Fluorolink (trade name) D4000, number average molecular weight: 4,000, polymer terminal structure: OH)

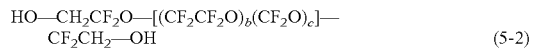

$$HO-CH_2CF_2O-[(CF_2CF_2O)_b(CF_2O)_c]-CF_2CH_2-OH \quad (5\text{-}2)$$

Compound (10): polyfluoropolyether (manufactured by Solvay, Fomblin (trade name) DIAC2000, number average molecular weight: 3,700, polymer terminal structure: COOH)

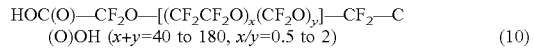

$$HOC(O)-CF_2O-[(CF_2CF_2O)_x(CF_2O)_y]-CF_2-C(O)OH \ (x+y=40 \text{ to } 180, x/y=0.5 \text{ to } 2) \quad (10)$$

Compound (11): a compound having a polyfluoropolyether chain and a hydrolyzable silyl group (manufactured by Asahi Glass Company, Limited, Afluid (registered trademark) S-550, polymer terminal structure: hydrolyzable silyl group and $CF_3$, a compound satisfying conditions as compound (5)).

(Fluorinated Solvent)

AC-6000: 1,1,1,2,2,3,3,4,4,5,5,6,6-tridecafluoro-octane (manufactured by Asahi Glass Company, Limited)

Production of Fluorinated Polymer Emulsion

Production Example 1

In a 1,000 mL stainless steel (SUS) container, 271.6 g (79 parts by mass) of C6FMA, 6.9 g (2 parts by mass) of HEMA, 6.9 g of PEO-13, 3.4 g of EPO-40, 2.7 g of ATMAC, 6.9 g of AGE-30, 531.8 g of water, 103.1 g of DPG and 0.3 g of StSH were put and mixed at 35° C. for 60 minutes to obtain a mixture.

While maintaining the temperature at 35° C. by using a high pressure emulsifier (manufactured by Manton Gaulin), the obtained mixture was pre-emulsified under 10 MPa and then treated under 40 MPa to obtain an emulsion. 700 g of the obtained emulsion was put into a SUS reaction container and was cooled to at most 30° C. 0.8 g of V-50 was added, and the gas phase was substituted by nitrogen, whereupon 33.5 g (13 parts by mass) of VdCl and 15.5 g (6 parts by mass) of VCM were introduced while preventing oxygen contamination, and while stirring, the polymerization reaction was conducted at 60° C. for 10 hours, and then water was added to obtain a fluorinated polymer (A-1) emulsion with a solid content concentration of 30 mass %. The proportions of structural units in the fluorinated polymer (A-1) were C6FMA/HEMA/VdCl/VCM=79/2/13/6 (mass %).

Production Example 2

In a 1,000 mL SUS container, 253.6 g (74 parts by mass) of C6FMA, 24.0 g (7 parts by mass) of STA, 13.7 g (4 parts by mass) of MOI-BP, 93.9 g of PEO-30, 3.1 g of EPO-40, 4.9 g of ATMAC, 439.3 g of water, 102.8 g of DPG and 3.4 g of DoSH were put and mixed at 40° C. for 60 minutes, to obtain a mixture.

While maintaining the temperature at 40° C. by using a high pressure emulsifier (manufactured by Manton Gaulin), the obtained mixture was pre-emulsified under 10 MPa and then treated under 50 MPa, to obtain an emulsion. 657 g of the obtained emulsion was put into a SUS reaction container and cooled to at most 30° C. 7.0 g of VA-061A was added, and the gas phase was substituted by nitrogen, whereupon 36.0 g (15 parts by mass) of VCM was introduced while preventing oxygen contamination, and the polymerization reaction was conducted at 65° C. for 10 hours with stirring, to obtain a fluorinated polymer (A-2) emulsion. The proportions of structural units in the fluorinated polymer (A-2) were C6FMA/STA/MOI-BP/VCM=74/7/4/15 (mass %).

In a 1,000 mL SUS container, 328.2 g (90 parts by mass) of C6FMA, 18.2 g (5 parts by mass) of BeMA, 10.9 g of AGE-10, 2.3 g of ATMAC, 582.7 g of water, 36.5 g of DPG and 1.8 g of StSH were put and mixed at 55° C. for 60 minutes, to obtain a mixture.

While maintaining the temperature at 55° C. by using a high pressure emulsifier (manufactured by Manton Gaulin), the obtained mixture was pre-emulsified under 10 MPa and then treated under 50 MPa, to obtain an emulsion. 736 g of the obtained emulsion was put into a SUS reaction container and cooled to at most 30° C. 0.8 g of V-601 was added, and the gas phase was substituted by nitrogen, whereupon 13.7 g (5 parts by mass) of VCM was introduced while preventing oxygen contamination, and the polymerization reaction was conducted at 65° C. for 20 hours with stirring, to obtain a fluorinated polymer (A-3) emulsion. The proportions of structural units in the fluorinated polymer (A-3) were C6FMA/BeMA/VCM=90/5/5 (mass %).

The emulsion of fluorinated polymer (A-2) and the emulsion of the fluorinated polymer (A-3) were mixed so that the mass ratio of the solid contents would be 1:1, and water was added to the mixture, to obtain a fluorinated polymer (A-4) emulsion wherein the solid content concentration was 20 mass %.

Production Example 3

In a 1,000 mL SUS container, 58.5 g (17 parts by mass) of C6FMA, 197.9 g (57.5 parts by mass) of BeA, 13.8 g (4 parts by mass) of DOM, 3.4 g (1 part by mass) of HEMA, 89.5 g PEO-30, 1.7 g of EPO-40, 2.7 g of ATMAC, 446.4 g of water, 103.2 g of DPG and 3.4 g of DoSH were put and mixed at 55° C. for 60 minutes to obtain a mixture.

While maintaining the temperature at 55° C. by using a high pressure emulsifier (manufactured by Manton Gaulin), the obtained mixture was pre-emulsified under 10 MPa and then treated under 50 MPa to obtain an emulsion. 690.6 g of the obtained emulsion was put into a SUS reaction container and cooled to at most 30° C. 6.5 g of VA-061A was added, and the gas phase was substituted by nitrogen, whereupon 52.9 g (20.5 parts by mass) of VCM was introduced while preventing oxygen contamination, and the polymerization reaction was conducted at 50° C. for 14 hours with stirring, and water was added to obtain a fluorinated polymer (A-5) emulsion wherein the solid content concentration was 30 mass %. The proportions of structural units in the fluorinated polymer (A-5) were C6FMA/BeA/DOM/HEMA/VCM=17/57.5/4/1/20.5 (mass %).

Preparation of First Liquid

Preparation Example 1

The fluorinated polymer (A-1) emulsion was diluted with tap water to adjust the solid content concentration to 1.0 mass %, then a melamine resin crosslinking agent (manufactured by DIC Corporation, Beckamine (trade name) M3) and an acid catalyst (manufactured by DIC Corporation, Accelerator ACX) were added so that the respective concentrations would be 0.21 mass % and 0.3 mass %, and further, a blocked isocyanate type crosslinking agent (manufactured by Meisei Chemical Works, Ltd., MEIKANATE TP-10) was added so that the concentration would be 0.6 mass %, to obtain a first liquid (11).

Preparation Example 2

A first liquid (12) was obtained in the same manner as in Preparation Example 1 except that the fluorinated polymer (A-1) emulsion was changed to the fluorinated polymer emulsion (A-4).

Preparation Example 3

A first liquid (13) was obtained in the same manner as in Preparation Example 1 except that the fluorinated polymer (A-1) emulsion was changed to the fluorinated polymer emulsion (A-5).

Preparation of Second Liquid

Preparation Examples 4 to 9

The compound (5-1) was dissolved in AC-6000 to obtain second liquids (21) to (26) with solid content concentrations as shown in Table 2 or Table 3.

Preparation Example 10

A second liquid (27) was obtained in the same manner as in Preparation Example 4 except that the compound (5-1) was changed to the compound (5-2).

Preparation Example 11

A second liquid (28) was obtained in the same manner as in Preparation Example 4 except that the compound (5-1) was changed to the compound (10).

Preparation Example 12

A second liquid (29) was obtained in the same manner as in Preparation Example 4 except that the compound (5-1) was changed to the compound (11).

Production of Water/Oil Repellent Article

Example 1

By a padding method, a nylon high density taffeta was immersed in the first liquid (11) and then squeezed so that the wet pick-up became 50 mass %. This was dried at 110° C. for 90 seconds and then dried at 180° C. for 60 seconds.

To the nylon high density taffeta treated with the first liquid (11), the second liquid (21) was coated by a bar coating method. This was dried at 180° C. for 120 seconds to obtain a test cloth.

Examples 2 to 6

Test cloths were obtained in the same manner as in Example 1 except that the second liquid (21) was changed to the second liquids (22) to (26), respectively.

Example 7

A test cloth was obtained in the same manner as in Example 1 except that the first liquid (11) was changed to the first liquid (12), and the second liquid (21) was changed to the second liquid (24).

Example 8

A test cloth was obtained in the same manner as in Example 7 except that the first liquid (12) was changed to the first liquid (13).

Example 9

A test cloth was obtained in the same manner as in Example 1 except that the second liquid (21) was changed to the second liquid (27).

Example 10

A test cloth was obtained in the same manner as in Example 1 except that the second liquid (21) was changed to the second liquid (29).

Comparative Example 1

By a padding method, a nylon high density taffeta was immersed in the first liquid (11) and then squeezed so that the wet pick-up became 50 mass %. This was dried at 110° C. for 90 seconds and then dried at 180° C. for 60 seconds to obtain a test cloth.

Comparative Example 2

A test cloth for evaluation of water and oil repellency was prepared in the same manner as in Comparative Example 1 except that the first liquid (11) was changed to the first liquid (12).

Comparative Example 3

A test cloth for evaluation of water and oil repellency was prepared in the same manner as in Comparative Example 1 except that the first liquid (11) was changed to the first liquid (13).

Comparative Example 4

A test cloth was obtained in the same manner as in Example 1 except that the second liquid (21) was changed to the second liquid (28).

<Evaluation of Water/Oil Repellent Article>

With respect to the respective test cloths obtained in the above-described Examples 1 to 10 and Comparative Examples 1 to 4, the above-described oil repellency, water repellency, washing durability of the water repellency, friction durability of the water repellency and heavy-rain durability were evaluated. The respective results are shown in the following Tables 2 to 4.

TABLE 2

| | | Example 1 | Example 2 | Example 3 | Example 4 | Example 5 |
|---|---|---|---|---|---|---|
| First liquid | | (11) | (11) | (11) | (11) | (11) |
| Second liquid | | (21) | (22) | (23) | (24) | (25) |
| Solid content concentration of second liquid [mass %] | | 0.001 | 0.01 | 0.1 | 0.3 | 0.5 |
| Amount [parts by mass] of fluorinated polyether to 100 parts by mass of fluorinated polymer | | 0.1 | 1 | 10 | 30 | 50 |
| Oil repellency | Initial | 5 | 5 | 5 | 5 | 5 |
| Water repellency | Initial | 5 | 5 | 5 | 5 | 5 |
| | Washing 20 times | 3+ | 3+ | 3+ | 3+ | 4 |
| | Rubbing 2,000 times | 5− | 5 | 5 | 5− | 5 |
| | Rubbing 10,000 times | 4 | 4+ | 5 | 5 | 5 |
| Heavy-rain durability | Initial | 5 | 5 | 5 | 5 | 5 |
| | Washing 5 times | 2 | 2 | 2 | 3 | 3 |
| | Washing 20 times | 1 | 1 | 1 | 2 | 3− |
| | Rubbing 10,000 times | 3 | 3+ | 5− | 5− | 4 |

TABLE 3

|  | | Example 6 | Example 7 | Example 8 | Example 9 | Example 10 |
|---|---|---|---|---|---|---|
| First liquid | | (11) | (12) | (13) | (11) | (11) |
| Second liquid | | (26) | (24) | (24) | (27) | (29) |
| Solid content concentration of second liquid [mass %] | | 1 | 0.3 | 0.3 | 0.3 | 0.3 |
| Amount [parts by mass] of fluorinated polyether to 100 parts by mass of fluorinated polymer | | 100 | 30 | 30 | 30 | 30 |
| Oil repellency | Initial | 5 | 5 | 5 | 4 | 4 |
| Water repellency | Initial | 5 | 5 | 5 | 5− | 5− |
|  | Washing 20 times | 5− | 2 | 2 | 4− | 4− |
|  | Rubbing 2,000 times | 5 | 4+ | 5 | 4− | 4+ |
|  | Rubbing 10,000 times | 5 | 4 | 5 | 3+ | 4 |
| Heavy-rain durability | Initial | 5 | 4 | 4 | 4 | 4 |
|  | Washing 5 times | 4 | 4 | 3 | 4 | 3 |
|  | Washing 20 times | 3 | 2 | 2+ | 2 | 3− |
|  | Rubbing 10,000 times | 4 | 3 | 4 | 3+ | 3 |

TABLE 41

|  | | Comparative Example 1 | Comparative Example 2 | Comparative Example 3 | Comparative Example 4 |
|---|---|---|---|---|---|
| First liquid | | (11) | (12) | (13) | (11) |
| Second liquid | | — | — | — | (28) |
| Solid content concentration of second liquid [mass %] | | — | — | — | 0.3 |
| Amount [parts by mass] of fluorinated polyether to 100 parts by mass of fluorinated polymer | | 0 | 0 | 0 | 30 |
| Oil repellency | Initial | 5 | 6 | 5 | 3 |
| Water repellency | Initial | 5 | 5 | 5 | 3− |
|  | Washing 20 times | 3+ | 2+ | 2 | 3 |
|  | Rubbing 2,000 times | 4+ | 4 | 5 | 1 |
|  | Rubbing 10,000 times | 4 | 3 | 3+ | 1 |
| Heavy-rain durability | Initial | 5 | 5 | 4 | 2 |
|  | Washing 5 times | 2 | 2 | 2 | 1+ |
|  | Washing 20 times | 1 | 2− | 2 | 1 |
|  | Rubbing 10,000 times | 3 | 2 | 3 | 1 |

INDUSTRIAL APPLICABILITY

The water/oil repellent article of the present invention is useful for fiber products (clothing articles (sportswear, coats, jackets, work clothing, uniforms, etc.), bags, industrial materials, etc.), non-woven fabrics, leather products, stone materials, concrete-type construction materials, etc. Further, the water/oil repellent composition of the present invention is useful not only for various water/oil repellents to be used in the production of various water/oil repellent articles, but also for coating agents for filtering material to be used in an organic solvent or in the presence of its vapor, surface protective agents, electronics coating agents, antifouling coating agents, etc. Furthermore, it is useful also for applications to impart water and oil repellency by mixing it with polypropylene, nylon, etc., followed by molding or fiberizing.

This application is a continuation of PCT Application No. PCT/JP2018/008628, filed on Mar. 6, 2018, which is based upon and claims the benefit of priority from Japanese Patent Application No. 2017-042648 filed on Mar. 7, 2017 and Japanese Patent Application No. 2017-220494 filed on Nov. 15, 2017. The contents of those applications are incorporated herein by reference in their entireties.

What is claimed is:

1. A method for producing a water/oil repellent article, comprising:

treating a substrate with a first liquid containing a fluorinated polymer having a structural unit based on a monomer (a) having a $C_{1-6}$ perfluoroalkyl group; and treating the substrate treated with the first liquid with a second liquid containing a fluorinated ether compound represented by formula (5):

$$A\text{-}U\text{—}W\text{—}V\text{—}B \tag{5}$$

where A and B are each independently $-CF_3$, $-OH$, $-C(O)OCH_3$, $-C(O)OH$ or a hydrolyzable silyl group, excluding a case where both A and B are $-C(O)OH$; U is a divalent organic group which optionally has fluorine atom(s), an oxygen atom provided only when A is $CF_3-$, or a single bond; V is a divalent organic group which optionally has fluorine atom(s), or a single bond provided only when B is $-CF_3$; and W is a group represented by formula (6):

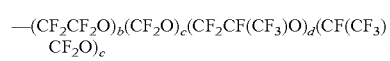

$$(CF_2CF_2CF_2O)_f(CF_2CF_2CF_2CF_2O)_g- \tag{6}$$

where b, c, d, e, f and g are each independently an integer of from 0 to 180, b+c+d+e+f+g is an integer of from 5 to 400, and the order of the respective oxyperfluoroalkylene units is not limited.

2. The method according to claim 1, wherein the monomer (a) is a compound represented by formula (1):

$$(Z\text{—}Y)_nX \tag{1}$$

where Z is a $C_{1-6}$ perfluoroalkyl group or a group represented by formula (2), Y is a divalent organic group having no fluorine atom, or a single bond, n is 1 or 2, and X is, when n is 1, any one of groups represented by formulae (3-1) to (3-5), and when n is 2, any one of groups represented by formulae (4-1) to (4-4):

$$C_iF_{2i+1}(CH_2CF_2)_p(CF_2CF_2)_q— \qquad (2)$$

where i is an integer of from 1 to 6, p is an integer of from 1 to 4, and q is an integer of from 1 to 3, $$—CR{=}CH_2 \qquad (3\text{-}1),$$

$$—C(O)OCR{=}CH_2 \qquad (3\text{-}2),$$

$$—OC(O)CR{=}CH_2 \qquad (3\text{-}3),$$

$$—OCH_2\text{-}\varphi—CR{=}CH_2 \qquad (3\text{-}4),$$

$$—OCH{=}CH_2 \qquad (3\text{-}5),$$

where R is a hydrogen atom, a methyl group or a halogen atom, and φ is a phenylene group, $$—CH[—(CH_2)_mCR{=}CH_2]— \qquad (4\text{-}1),$$

$$—CH[—(CH_2)_mC(O)OCR{=}CH_2]— \qquad (4\text{-}2),$$

$$—CH[—(CH_2)_mOC(O)CR{=}CH_2]— \qquad (4\text{-}3),$$

$$—OC(O)CH{=}CHC(O)O— \qquad (4\text{-}4)$$

where R is a hydrogen atom, a methyl group or a halogen atom, and m is an integer of from 0 to 4.

3. The method according to claim 1, wherein the fluorinated polymer further has a structural unit based on a monomer (b1), a structural unit based on a monomer (b2), or both:
wherein the monomer (b1) is a (meth)acrylate having no polyfluoroalkyl group and having a $C_{12\text{-}30}$ alkyl group, and
the monomer (b2) is a halogenated olefin.

4. The method according to claim 3, wherein the fluorinated polymer further has a structural unit based on a monomer (c) having a cross-linkable functional group, and/or a structural unit based on a monomer (d) which is other than the monomers (a), (b1) and (b2).

5. The method according to claim 1, wherein the second liquid further contains a fluorinated solvent having a boiling point at atmospheric pressure (normal boiling point) of at least 50° C.

6. The method according to claim 5, wherein the fluorinated solvent is at least one member selected from the group consisting of 1,1,1,2,2,3,3,4,4,5,5,6,6-tridecafluoro-octane, 1,1,2,2-tetrafluoro-ethyl-2,2,2-trifluoroethyl ether, 1-methoxy-1,1,2,2,3,3,3-heptafluoropropane, 1-methoxy-1,1,2,2,3,3,4,4,4-nonafluorobutane, 1-ethoxy-1,1,2,2,3,3,4,4,4-nonafluorobutane, 1,1,1,2,2,3,4,5,5,5-decafluoro-3-methoxy-4-trifluoromethyl-pentane, 1,1,1,2,2,3,4,5,5,5-decafluoropentane, poly(1,1,2,3,3,3-hexafluoropropene oxide), 1,3-bistrifluoromethylbenzene, 1,4-trifluoromethyl-benzene, trifluorotoluene, perfluorobenzene and perfluorobutylamine.

7. The method according to claim 1, wherein the amount of the fluorinated ether compound in the second liquid is from 0.1 to 100 parts by mass based on 100 parts by mass of the fluprinated polymer in the first liquid.

8. The method according to claim 1, wherein the amount of the fluorinated ether compound in the second liquid is from 30 to 100 parts by mass based on 100 parts by mass of the fluorinated polymer in the first liquid.

9. The method according to claim 2, wherein structural units of the fluorinated polymer consist of:
the structural unit based on the monomer (a); and
optionally at least one structural unit selected from the group consisting of
a structural unit based on a monomer (b1), where the monomer (b1) is a (meth)acrylate having no polyfluoroalkyl group and having a $C_{12\text{-}30}$ alkyl group,
a structural unit based on a monomer (b2), where the monomer (b2) is a halogenated olefin,
a structural unit based on a monomer (c), where the monomer (c) is N-methylol (meth)acrylamide, 2-hydroxyethyl (meth)acrylate, 4-hydroxybutyl (meth)acrylate, a 3,5-dimethylpyrazole adduct of 2-isocyanatoethyl (meth)acrylate, a 3,5-dimethylpyrazole adduct of 3-isocyanatopropyl (meth)acrylate, or 3-chloro-2-hydroxypropyl (meth)acrylate, and
a structural unit based on a monomer (d), where the monomer (d) is a maleic acid alkyl ester.

10. The method according to claim 9,
wherein the monomer (a) is $F(CF_2)_6CH_2CH_2OC(O)C(CH_3){=}CH_2$,
the monomer (b1) is behenyl acrylate, stearyl acrylate, or behenyl methacrylate,
the monomer (b2) is vinylidene chloride or vinyl chloride,
the monomer (c) is 2-hydroxyethyl methacrylate or a 3,5-dimethylpyrazole adduct of 2-isocyanatoethyl methacrylate, and
the monomer (d) is maleic acid bis(2-ethylhexyl).

* * * * *